(12) United States Patent
Sears et al.

(10) Patent No.: US 6,889,949 B2
(45) Date of Patent: May 10, 2005

(54) QUICK RELEASE BASE AND MOUNTING BRACKET FOR NAPKIN DISPENSER

(75) Inventors: Charles W. Sears, Boxford, MA (US); William T. Fitzsimmons, Stow, MA (US); William J. Jacobs, St. Augustine, FL (US)

(73) Assignee: Fort James Corporation, Atlanta, GA (US)

( * ) Notice: Subject to any disclaimer, the term of this patent is extended or adjusted under 35 U.S.C. 154(b) by 30 days.

(21) Appl. No.: 10/713,954

(22) Filed: Nov. 14, 2003

(65) Prior Publication Data

US 2004/0149879 A1 Aug. 5, 2004

Related U.S. Application Data

(63) Continuation of application No. 10/357,781, filed on Feb. 4, 2003, now Pat. No. 6,669,162.

(51) Int. Cl.[7] ............................................. A47B 91/00
(52) U.S. Cl. ................ 248/346.04; 248/188.1
(58) Field of Search ...................... 248/346.01, 346.04, 248/188.1, 188.8, 221.11, 225.11, 298.1, 905, 310, 311.2, 151, 157, 407, 409

(56) References Cited

U.S. PATENT DOCUMENTS

| | | | | |
|---|---|---|---|---|
| 3,993,278 A | * | 11/1976 | Race ........................... 248/551 |
| 4,050,663 A | * | 9/1977 | Rogers ..................... 248/316.4 |
| 4,094,442 A | | 6/1978 | Radek .......................... 221/59 |
| 4,103,983 A | * | 8/1978 | Morrison et al. ........... 439/298 |
| 4,311,252 A | | 1/1982 | Hope, Jr. et al. ............. 221/57 |
| 4,343,415 A | | 8/1982 | Radek .......................... 221/59 |
| 4,502,656 A | * | 3/1985 | Zeitler ................... 248/346.03 |
| 4,679,703 A | | 7/1987 | De Luca ....................... 221/52 |
| 4,754,943 A | * | 7/1988 | Froutzis ................... 248/188.1 |
| 4,838,454 A | | 6/1989 | Salzmann et al. ............. 221/57 |
| 5,065,895 A | | 11/1991 | De Luca et al. .............. 221/54 |
| 5,660,442 A | * | 8/1997 | Tornero ................. 297/411.36 |
| 6,252,766 B1 | * | 6/2001 | Radloff ...................... 361/683 |
| 6,334,544 B1 | * | 1/2002 | Christensen et al. .......... 221/63 |
| 6,352,308 B1 | * | 3/2002 | Chen ..................... 297/344.21 |
| 6,428,099 B1 | * | 8/2002 | Kain ........................ 397/256.1 |
| 2001/0054673 A1 | * | 12/2001 | Ku ........................ 248/346.01 |

* cited by examiner

*Primary Examiner*—Anita King
*Assistant Examiner*—Amy J. Sterling
(74) *Attorney, Agent, or Firm*—Michael W. Ferrell

(57) ABSTRACT

A countertop mounting base and bracket for a napkin dispenser includes a base with a generally planar upper surface provided with a sidewall having a stepped locking recess adapted to cooperate with a stepped tongue of a mounting bracket which is secured directly to the counter. The base and bracket allow for the quick release of a gravity feed napkin dispenser, for example, mounted on the countertop.

20 Claims, 4 Drawing Sheets

QUICK RELEASE BASE AND MOUNTING BRACKET FOR NAPKIN DISPENSER

CROSS-REFERENCE TO RELATED APPLICATIONS

This patent application is a continuation of U.S. patent application Ser. No. 10/357,781, filed Feb. 4, 2003, now U.S. Pat. No. 6,669,162. The priority of the foregoing application is hereby claimed.

TECHNICAL FIELD

The present invention relates generally to napkin dispensers and in a preferred embodiment to a gravity feed countertop mounted napkin dispenser having a base secured to a countertop with a quick release mounting bracket.

BACKGROUND ART

Dispensers for napkins including inter-folded napkins are well known in the art. Typically such dispensers are spring-loaded dispensers as is shown, for example, in the U.S. Pat. No. 4,838,454 to Salzmann et al. This class of dispensers are typically placed on a countertop. There is shown in the '454 patent a napkin dispenser including a drawer which slides in and out of the housing and a push plate which also slides in the housing and is spring-biased to push the napkins forward. A pair of locks on the rear of the drawer in the preferred napkin dispenser pushes the plate forward when the drawer is open but pivot to release the push plate when the drawer is closed so the napkins are not pressed too tightly, even if napkins are overloaded in the drawer when it is open.

U.S. Pat. No. 4,679,703 to De Luca discloses a napkin dispenser configured to reduce bunching at the dispensing opening in the napkin dispenser. A pair of pressure relief rods are provided along the upper and lower portions of the dispenser face plate to relieve pressure between the face plate and the center portion of the napkin stack.

U.S. Pat. No. 4,343,415 to Radek shows a napkin dispenser designed for disposition on a restaurant table or counter housing a stack of paper napkins. The dispenser is in the form of a parallelepiped with a top axis opening for loading and removing napkins. The opening is generally rectangular or may taper slightly from one end to the other. A salient feature is that the edges of the opening extend outwardly providing a relatively narrow peripheral arcuate flange or lip around the opening, the effect of which is to lead a napkin gently outwardly without likelihood of damage to the exiting napkins.

U.S. Pat. No. 4,311,252 to Hope, Jr. et al. discloses a large capacity elevator type napkin dispenser including an elongated supporting structure or cage composed of series of spaced rod-like vertical supports. A stack of folded napkins is supported on a pressure plate that is mounted on a carriage adapted to slide vertically within the cage, whereas U.S. Pat. No. 4,094,442, also to Radek discloses a napkin dispenser provided with an aperture which is generally rectangular except for a concavely arcuate edge on one side from which the napkins are normally extracted. Two opposed sides of the opening normal to the arcuate edge are provided with a pair of relatively narrow spring-biased leaves resiliently extendable into the container to facilitate loading, the free edges of the leaves being longitudinally gently oblique and widening to the aforesaid arcuate edge. Each of the leaves has a longitudinal outwardly turned lip and the exposed corners of the leaves are rounded. The features are reported to contribute towards a convenient extraction of a napkin without damage.

As will be appreciated from the foregoing, spring-biased dispensers are prone to overfilling and malfunction and may damage product if the dispensers are misused. Gravity feed dispensers are simpler and less subject to malfunction; however they are more difficult to conveniently locate in establishments which require countertop access to the napkins.

SUMMARY OF INVENTION

There is provided generally in accordance with the invention a countertop mounting base and bracket for releasably securing a napkin dispenser attached to the base. The mounting system includes a base having a generally planar upper surface and a sidewall extending downwardly therefrom to define a hollow cavity and also defining a stepped locking recess having an upper portion with a first recess width and a lower portion with a second recess width where the upper locking recess width is smaller than the lower locking recess width. The base is also provided with a plurality of locking projections in the hollow cavity having locking shoulders thereon each of which has a characteristic locking shoulder width. The base cooperates with a mounting bracket provided with means for attaching the bracket to a countertop. The bracket has a raised central locking surface provided with a moveable tongue adapted to flex with respect to the locking surface from a locking position to a release position. The tongue is provided with a stepped outer profile defining an outer width which is less than equal to the upper recess width of the base. The tongue also has a locking width which is greater than the upper recess width of the base, the locking surface of the mounting bracket being further provided with a plurality of locking slots with open portions having widths at least as great as a corresponding characteristic width of a locking shoulder of a corresponding locking projection of the base. The locking slots of the locking surface also have elongated narrow portions with widths smaller than corresponding characteristic widths of locking shoulders of locking projections of the base. The base and mounting bracket are configured such that the locking projections of the base may be inserted into the open portions of the locking slots and the base slid into the locking position with the bracket wherein the shoulders of the locking projections of the base are secured from vertical translation away from the locking position by the elongated narrow portions of the locking slots of the raised central locking surface of the mounting bracket. The base is concurrently prevented from horizontal translation away from the locking position by the locking width of the tongue until the tongue is flexed downwardly to its release position.

Typically the base further includes a post for mounting a napkin dispenser, such as a gravity feed napkin dispenser of the general class disclosed in U.S. patent application Ser. No. 10/213,575, filed Aug. 7, 2002, entitled "Gravity-Feed Dispenser and Method of Dispensing Inter-Folded Napkins", the disclosure of which is hereby incorporated by reference. So also, in a preferred embodiment the mounting bracket is stamped from sheet metal and the base is cast from white metal.

Generally, the tongue requires a force of from about 2 to about 10 pounds to move it from the locking position to the release position. In the locking position, the tongue may be generally co-planar with the raised locking surface of the mounting bracket or it may be elevated slightly in portions if so desired. Typically, the tongue requires a force of from about 4 to about 6 pounds to move it from the locking position to the release position.

In a preferred embodiment the assembly of the bracket and base includes biasing means to urge the base and bracket into engagement with each other in the locking position. The biasing means may be, for example, upwardly raised portions defined on the mounting bracket and downwardly projecting ridges on the base located within the hollow cavity. There are optionally provided guide ridges on the base as described hereinafter. The upper portion of the stepped locking recess of the base typically has an L-shaped profile as does a lower portion of the stepped locking recess of the base. The stepped outer profile of the tongue is also generally L-shaped on both sides and may include an arcuate central portion at the end of the tongue.

A particularly preferred arrangement is a countertop mounting base and bracket for releasably securing a napkin dispenser including a base with a generally planar upper surface and a sidewall extending downwardly therefrom to define a hollow cavity wherein there is provided a plurality of downwardly extending vertical ribs including at least two longitudinally extending mounting ribs each of which is provided with at least one engagement ridge thereon. The sidewall also defines a stepped locking recess having an upper portion with a first recessed width and a lower portion with a second recessed width where the upper recessed width is smaller than the lower recessed width. A base is further provided with a plurality of locking projections in the hollow cavity having locking shoulders each of which has a characteristic locking shoulder width.

The mounting bracket is provided with means for securing it to the countertop as well as at least two longitudinal guide tracks each of which has at least one raised engagement portion for interacting with the engagement ridges of the mounting ribs of the base. The bracket further includes a raised central locking surface between the longitudinal guide tracks provided with a moveable tongue adapted to flex with respect to the locking surface from a locking position to a release position, the tongue being provided with a stepped outer profile defining an outer width which is less than equal to the upper recess width of the base and a locking width which is greater than the upper recessed width of the base. The locking surface of the mounting bracket is still further provided with a plurality of locking slots with open portions having widths at least as great as the corresponding characteristic widths of the locking shoulders of the locking projections of the base and elongated narrow portions having widths smaller than corresponding characteristic widths of locking shoulders of locking projections of the base. The base and mounting bracket are configured such that the locking projections on the base may be inserted into the open portions of the locking slots and the base slid into the locking position with the bracket wherein the shoulders of the locking projections of the base are secured from translation away from the locking position by the elongated narrow portions of the locking slots of the raised central locking surface of the mounting bracket. The base is prevented from horizontal translation away from the locking position by the locking width of the tongue until the tongue is flexed downwardly to its release position. In this preferred embodiment the engagement ridges of the base and the raised engagement portions of the mounting bracket urge the mounting bracket and the base into engagement with each other. The engagement portions of the mounting bracket are preferably arcuate portions of the guide tracks of the mounting bracket.

BRIEF DESCRIPTION OF DRAWINGS

The invention is described in detail below with reference to the various Figures in which like numerals designate similar parts and wherein.

DETAILED DESCRIPTION

The invention is described in detail below in connection with several embodiments. Such description is for purposes of illustration and exemplification only. Variants to the embodiments illustrated within the spirit and scope of the present invention, set forth in the appended claims, will be readily apparent to those of skill in the art.

Figure 1:
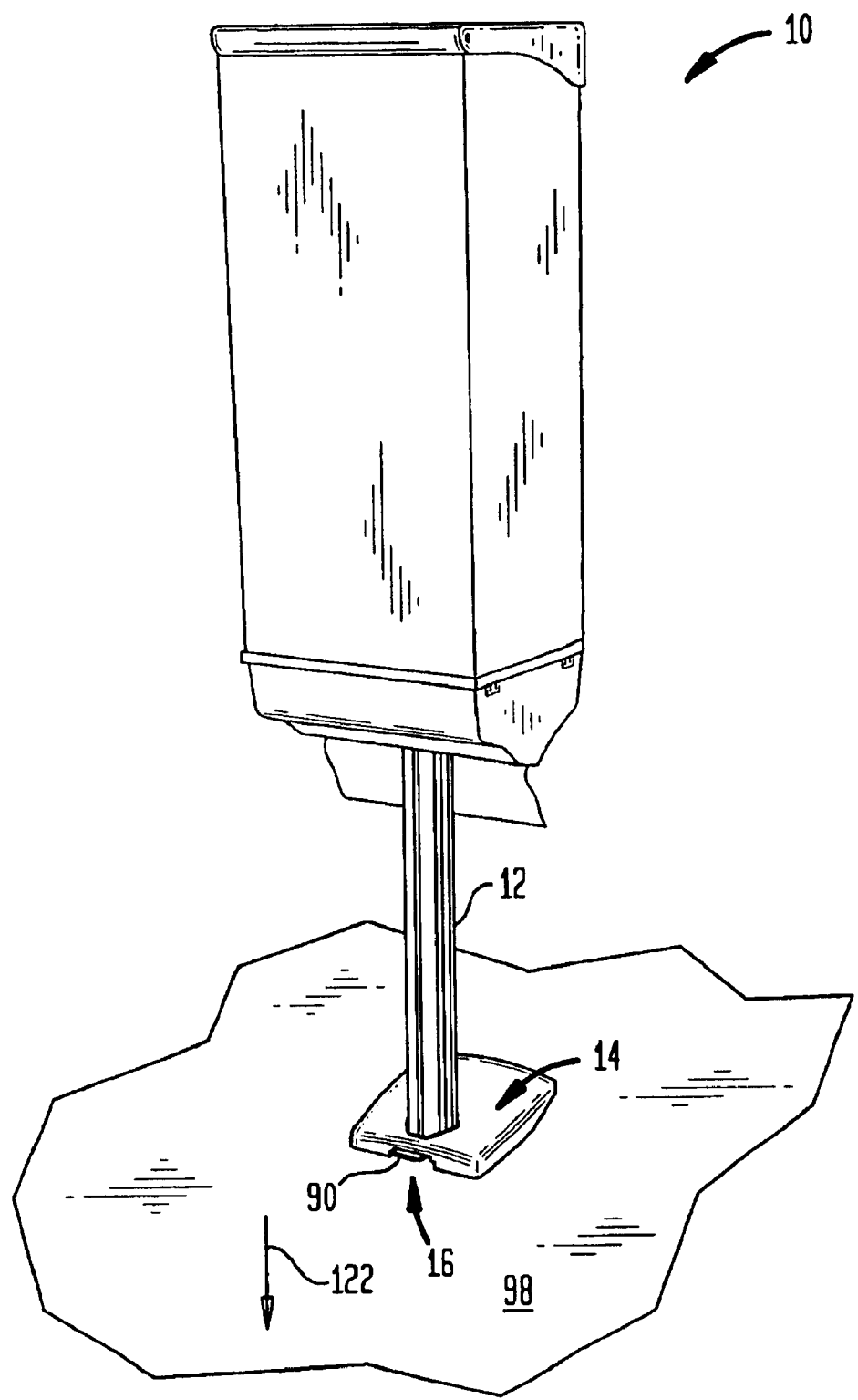
FIG. 1 is a perspective view of a gravity feed napkin dispenser mounted on a countertop with the mounting base and bracket in accordance with the present invention.
Figure 2:
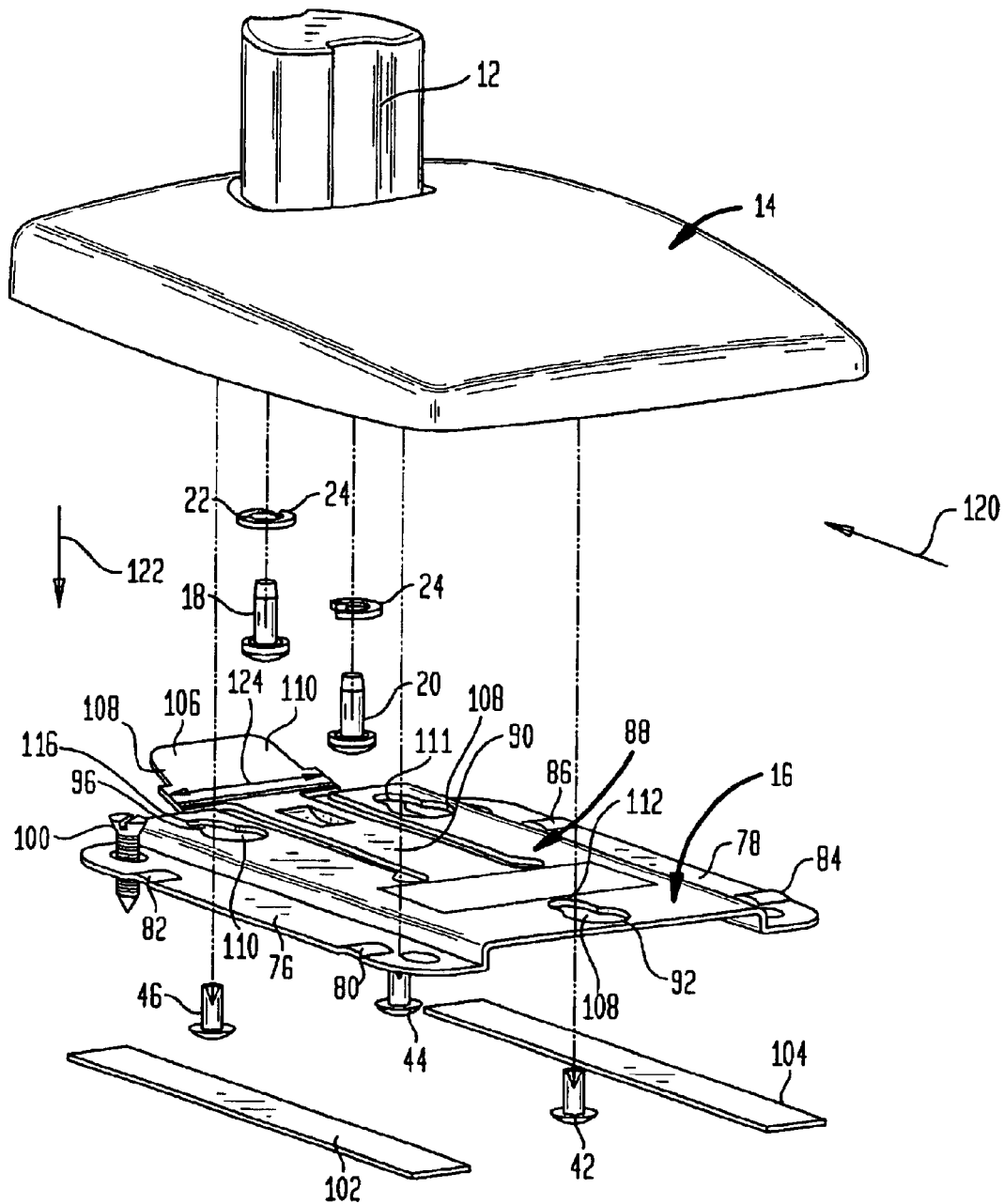
FIG. 2 is an exploded view in perspective showing the inventive base and mounting bracket of FIG. 1.
Figure 3:
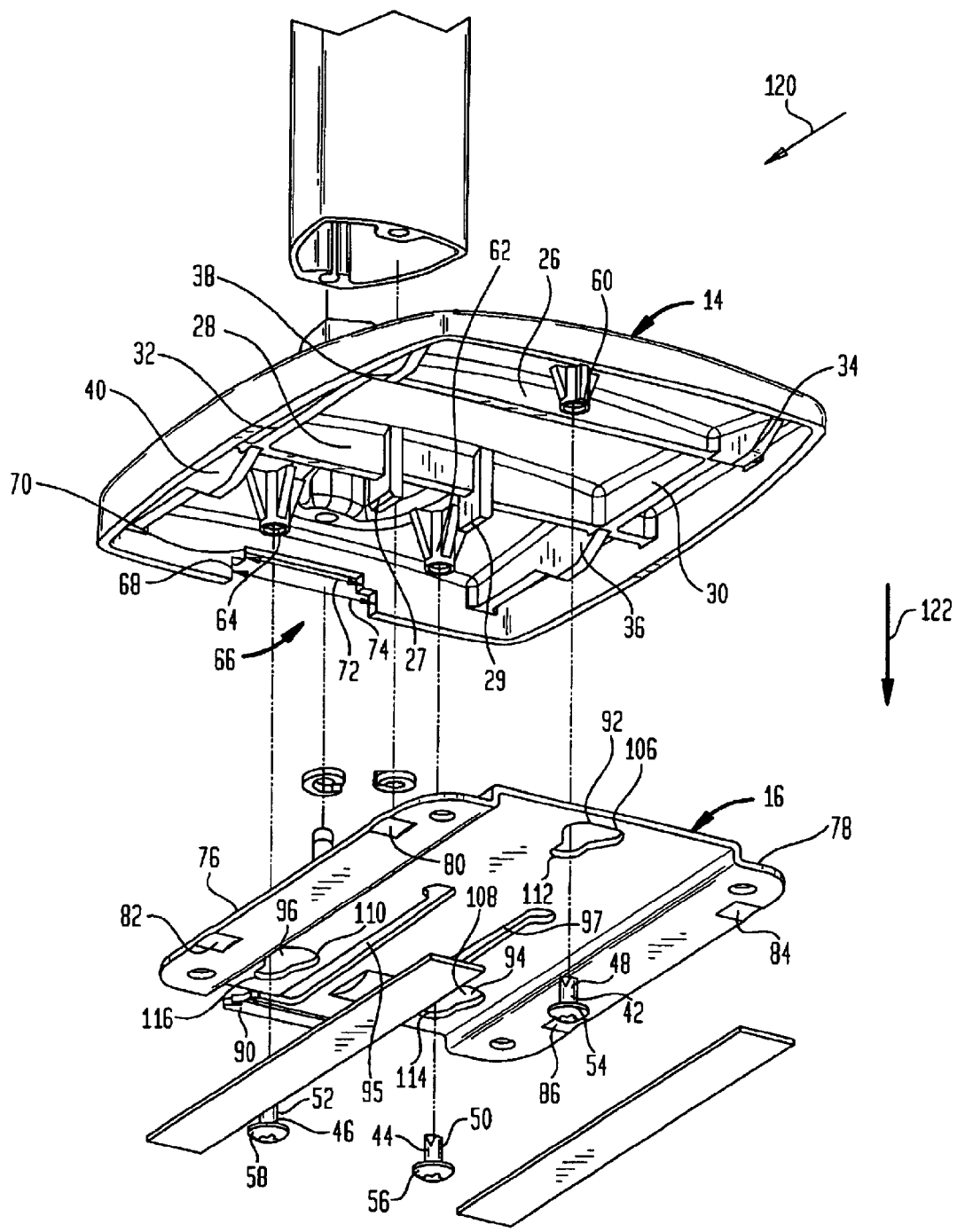
FIG. 3 is another exploded view in perspective showing the inventive mounting base and bracket of FIG. 1.

Referring to FIGS. 1–3 there is shown a gravity feed napkin dispenser 10 mounted on a post 12 secured to a mounting base 14 configured in accordance with the present invention. Mounting base 14, in turn, is secured to a mounting bracket 16 as appears in FIGS. 1, 2 and 3. Napkin dispenser 10 may be of the class described in co-pending application Ser. No. 10/213,575, filed Aug. 7, 2002 entitled "Gravity-Feed Dispenser and Method of Dispensing Inter-Folded Napkins". The post upon which napkin dispenser 10 is mounted maybe secured to base 14 by way of screws 18 and 20 provided with washers 22 and 24.

Base 14 is provided with a plurality of ridges such as transverse ribs 26 and 28, guide ridges 27, 29 as well as longitudinal ribs 30 and 32. Ribs 30 and 32 are provided with ridges 34, 36, 38 and 40 as can be seen in FIG. 3. There is also provided on the base a plurality of locking projections in the form of fasteners 42, 44, and 46 each of which has a shaft 48, a shaft 50 and a shaft 52 as well as a head 54, a head 56 and a head 58. Fasteners may be screws or bolts or the like which are fitted to be secured in holes 60, 62 and 64 respectively defined on base 14. The fastener operates as locking projections as will become apparent from the discussion which follows.

The base is further provided with a stepped recess 66 which has L-shaped profiles at his lower portion 68 and its upper portion 70 as is best seen in FIG. 3. Note that the width of the upper portion of recess 66 indicated at 72 is less than the width of the lower portion of recess 66 indicated at 74.

The base is specifically designed to cooperate with the countertop mounting bracket 16. Mounting bracket 16 has a left track 76 and a right track 78 each of which has a pair of arcuate projections 80, 82, 84, and 86 which interact with the ridges 34, 36, 38 and 40 of the base in order to urge the bracket and mounting base into contact with each other when the base is secured to the bracket. The bracket is further provided with a raised central portion 88 which has a tongue 90 as well as locking slots 92, 94 and 96. There are further provided guide slots 95, 97 on either side of the tongue. The mounting bracket is secured to a countertop 98 by way of screws such as screw 100 or by way of double sided tape indicated at 102 and 104. Note that tongue 90 also has a stepped profile at its portion 106 notably having L-shaped profile on either of its side at 108 and 110.

In order to secure the napkin dispenser to countertop 98 the mounting bracket 16 is first secured to the countertop. Base 14 optionally provided with mounting post 14 and napkin dispenser 10 is secured to the mounting bracket by way of fasteners 42, 46 and 48. That is to say, the fasteners are first inserted into the open portions 106, 108 and 110 of slots 92, 94, and 96 and then the entire base is slid rearwardly in the direction indicated by arrow 120 in FIGS. 2 and 3 such that the fastener heads will be restrained from vertical translation by the narrow portions 112, 114, and 116 of slots 92, 94 and 96. When the base is slid rearwardly into the locking position shown in FIG. 1 the stepped profile of tongue 90 prevents the base from sliding forwardly to the release position until tongue 90 is pressed downwardly in the direction indicated by arrow 122. That is to say tongue 90 by virtue of the fact that its width at 124 is wider than the width 72 of the upper portion of the locking recess of base 14 prevents horizontal translation of the base away from the locking position shown in FIG. 1 until tongue 90 is pressed downwardly in the direction indicated by arrow 122 to a release position where the width 124 is below the upper portion of slot 66 as should be fully appreciated from FIGS. 1, 2 and 3. So also, the various raised portions of tracks 76 and 78, that is raised portions 80, 82, 84 and 86 interact with the engagement ridges 34, 36, 38 and 40 of the base to urge the bracket and base into secure contact with one another so that the napkin dispenser will not rock when secures to countertop 98. Preferably, width 124 of tongue 90 is larger than width 72 of the upper portion of recess 66 but smaller than width 74 of the lower portion of stepped recess 66. In preferred embodiments, the base and bracket are urged into engagement before tongue 90 latches into place in its locking position in slot 66. So also, base 14 preferably includes guide ridges 27, 29 which cooperate with slots 95, 97 of the mounting bracket in order to orient the base with respect to the bracket and prevent unwanted snagging of the locking projections on slots or holes while the assembly is being locked into engagement. That is to say, ridges 27, 29 are configured to cooperate with slots 95, 97 in order to orient the base with respect to the mounting bracket as the base is being engaged with the mounting bracket.

Figure 4:
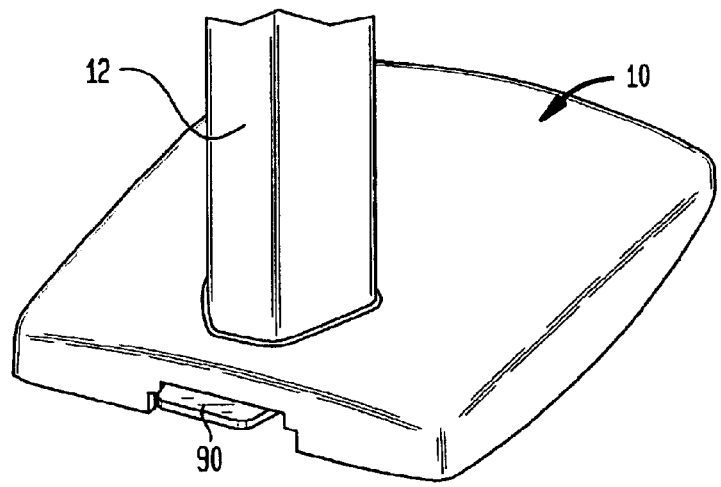
FIGS. 4–6 are schematic views in perspective of another embodiment of the mounting base and bracket of the present invention.
Figure 5:
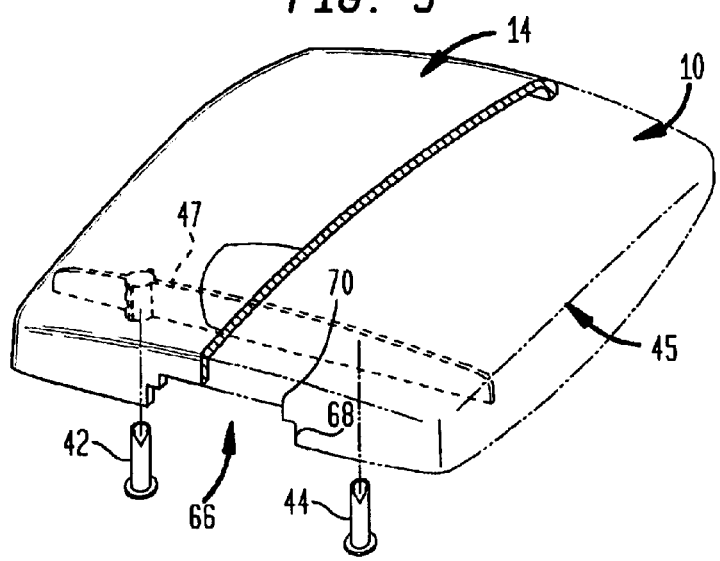
Figure 6:
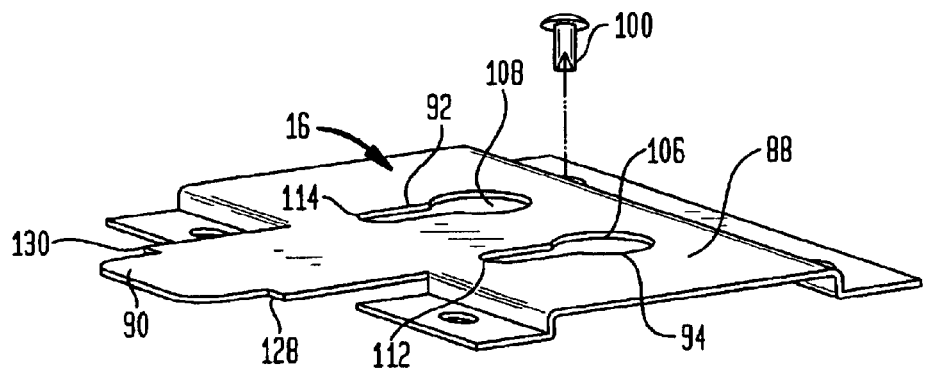

There is shown in FIGS. 4–6 an alternate embodiment of the inventive bracket and mounting base for a napkin dispenser. The mounting base and bracket have generally the features described above in connection with the embodiment of FIGS. 1–3. However, here mounting bracket 16 is secured to countertop 98 by way of four screws such as screws 100, located on the various corners of the mounting bracket. The mounting bracket has a raised central portion 88 which is generally planar as is tongue 90. That is to say, tongue 90 is co-planar with the rest of raised portion 88. Raised portion 88 is only provided with two slots 92 and 94 having open portions 106 and 108 as well as narrow portions 112 and 114. The base is provided with a stepped locking recess 66 having an upper portion and a lower portion with two L-shaped shoulders on either side of upper and lower parts of the stepped recess 66. That is, both the upper portion 70 and lower portion 68 of recess 66 have L-shaped profiles on both sides as shown. Here again the base 14 has an upper surface and a hollow cavity 45 for mounting over bracket 16. There is optionally provided transverse support ribs such as rib 47 to strengthen the base. Here again tongue 90 has a pair of shoulders 128 and 130 to interact with stepped recess 66 in order to secure the base in the locked position until tongue 90 is pressed downwardly to release the base so that it may be slid away from mounting bracket 16.

While the invention has been described in connection with several embodiments, modifications of those embodiments within the spirit and scope of the present invention will be readily apparent to those of skill in the art. The invention is defined in the appended claims.

What is claimed is:

1. A countertop mounting base and bracket for releasably securing a paper product dispenser attached to the base comprising:
    a) a base having an upper surface and a sidewall extending downwardly therefrom to define a hollow cavity and also define a stepped locking recess having an upper portion with a first recess width and a lower portion with a second recess width, where the upper locking recess width is smaller than the lower locking recess width, the base being further provided with a plurality of locking projections disposed in the hollow cavity having locking shoulders thereon each of which has a characteristic locking shoulder width;
    b) a mounting bracket provided with means for securing it to the countertop and a raised central locking surface provided with a moveable tongue adapted to flex with respect to the locking surface from a locking position to a release position, the tongue being provided with a stepped outer profile defining an outer width which is less than or equal to the upper recess width of the base and a locking width which is greater than the upper recess width of the base, the locking surface of the mounting bracket being further provided with a plurality of locking slots with open portions having widths at least as great as the corresponding characteristic widths of locking shoulders of the locking projections of the base and elongated narrow portions having widths smaller than corresponding characteristic widths of locking shoulders of locking projections of the base; and
    c) the base and mounting bracket being configured such that the locking projections of the base may be inserted into the open portions of the locking slots and the base slid into the locking position with the bracket wherein the shoulders of the locking projections of the base are secured from vertical translation away from the locking position by the elongated narrow portions of the locking slots of the raised central locking surface of the mounting bracket and the base is prevented from horizontal translation away from the locking position by the locking width of the tongue until the tongue is flexed to its release position.

2. The countertop mounting base and bracket according to claim 1, further comprising a post attached to the base for mounting a napkin dispenser.

3. The countertop mounting base and bracket according to claim 2, used for mounting a gravity feed napkin dispenser.

4. The countertop mounting base and bracket according to claim 1, wherein the mounting bracket is stamped from sheet metal.

5. The countertop mounting base and bracket according to claim 1, wherein the base is cast from metal.

6. The countertop mounting base and bracket according to claim 1, wherein the tongue requires a force of from about 2 to about 10 pounds to move it from the locking position to the release position.

7. The countertop mounting base and bracket according to claim 6, wherein the tongue requires a force of from about 4 to about 6 pounds to move it from the locking position to the release position.

8. The countertop mounting base and bracket according to claim 1, further comprising biasing means to urge the base and bracket into engagement with each other in the locking position.

9. The countertop mounting base and bracket according to claim 8, wherein the biasing means are upwardly raised portions defined on the bracket and downwardly projecting ridges on the base located within the hollow cavity thereof.

10. The countertop mounting base and bracket according to claim 1, wherein the upper portion of the stepped locking recess of the base has a generally L-shaped profile.

11. The countertop mounting base and bracket according to claim 10, wherein the lower portion of the stepped locking recess of the base has a generally L-shaped profile.

12. The countertop mounting base and bracket according to claim 1, wherein the stepped outer profile of the tongue is generally L-shaped.

13. The countertop mounting base and bracket according to claim 12, wherein the outer edge of the tongue is arcuate in shape.

14. A countertop mounting base and bracket for releasably securing a paper product dispenser attached to the base comprising:
   a) a base having an upper surface and a sidewall extending downwardly therefrom to define a hollow cavity and also define a locking recess;
   b) a mounting bracket provided with means for securing it to the countertop and a moveable tongue adapted to flex with respect to the locking surface from a locking position to a release position;
       wherein at least one of the base and bracket is provided with a locking projection and at least one of the base and bracket is provided with a locking slot configured to cooperate with the locking projection to releasably secure the base to the bracket; and
   c) the base and mounting bracket further being configured such that the locking projection may be inserted into the locking slot and the base slid into a locking position with the bracket wherein a shoulder of the locking projection is secured from vertical translation away from the locking position by an elongated narrow portion of the locking slot and the base is prevented from horizontal translation away from the locking position until the tongue is flexed to its release position.

15. The countertop mounting base and bracket according to claim 14, used for mounting a gravity feed napkin dispenser.

16. The countertop mounting base and bracket according to claim 14, wherein the mounting bracket is stamped from sheet metal.

17. The countertop mounting base and bracket according to claim 14, wherein the base is cast from metal.

18. The countertop mounting base and bracket according to claim 14, wherein the tongue requires a force of from about 2 to about 10 pounds to move it from the locking position to the release position.

19. The countertop mounting base and bracket according to claim 18, wherein the tongue requires a force of from about 4 to about 6 pounds to move it from the locking position to the release position.

20. The countertop mounting base and bracket according to claim 14, further comprising biasing means to urge the base and bracket into engagement with each other in the locking position.

* * * * *